(12) United States Patent
Wang et al.

(10) Patent No.: US 7,266,392 B2
(45) Date of Patent: Sep. 4, 2007

(54) RECONFIGURABLE PERIPHERAL DEVICE FOR USE WITH WIRELESS APPARATUS

(75) Inventors: Jong-Ding Wang, Taipei (TW);
Meng-Stephen Su, Taipei (TW); Kris Verstockt, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 11/158,077

(22) Filed: Jun. 22, 2005

(65) Prior Publication Data

US 2006/0246948 A1 Nov. 2, 2006

(30) Foreign Application Priority Data

May 2, 2005 (TW) ................................ 94114096 A

(51) Int. Cl.
*H04B 1/38* (2006.01)
*H04M 1/00* (2006.01)

(52) U.S. Cl. .................. 455/558; 455/41.1; 455/569.1; 455/457; 455/556.1; 455/575.1; 455/90.1; 455/90.2

(58) Field of Classification Search ............. 455/556.1, 455/558, 569.1
See application file for complete search history.

(56) References Cited

U.S. PATENT DOCUMENTS 5,819,183 A * 10/1998 Voroba et al. ............... 455/570

| | | | |
|---|---|---|---|
| 6,771,981 B1* | 8/2004 | Zalewski et al. | 455/557 |
| 2004/0097273 A1* | 5/2004 | Chiang | 455/569.1 |
| 2004/0185915 A1 | 9/2004 | Ihara | 455/569.1 |
| 2004/0203351 A1 | 10/2004 | Shearer | 455/41.4 |

FOREIGN PATENT DOCUMENTS

| EP | 1 161 064 A2 | 5/2001 |
|---|---|---|
| GB | 2 400 773 A | 10/2004 |

* cited by examiner

*Primary Examiner*—Nick Corsaro
*Assistant Examiner*—Amancio Gonzalez
(74) *Attorney, Agent, or Firm*—Troxell Law Office, PLLC

(57) ABSTRACT

A reconfigurable peripheral device for use with a wireless apparatus is employed for receiving a signal from the wireless apparatus and transmitting a signal to the wireless apparatus. The reconfigurable peripheral device includes a first member, a second member and a third member. The first member includes a badge. The second member is detachably coupled to the first member, and includes a wireless signal processing circuit for receiving the signal from the wireless apparatus and transmitting the signal to the wireless apparatus. The third member is coupled to the second member, and includes an output device for outputting the signal received by the second member to the user.

6 Claims, 8 Drawing Sheets

RECONFIGURABLE PERIPHERAL DEVICE FOR USE WITH WIRELESS APPARATUS

FIELD OF THE INVENTION

The present invention relates to a peripheral device for use with a wireless apparatus, and more particularly to a reconfigurable peripheral device for use with a wireless apparatus.

BACKGROUND OF THE INVENTION

With increasing development of the wireless apparatuses such as mobile phones or personal digital assistants (PDAs), many peripheral devices are widely employed in order to enhance convenience and utility of the wireless apparatuses.

For example, a wireless earphone device is a common peripheral device of a mobile phone. By using this wireless earphone device, the user is able to answer a call without holding the mobile phone. In addition, for some wireless earphone devices, a screen is arranged on the main body of the wireless earphone device to display the information associated with the mobile phone, for example the phone number of a caller. In response to an incoming call, the wireless earphone device should be taken out from the user's ears, and then the user may determine whether to answer this call according to the information displayed on the screen. Once the user is intended to answer this call, the wireless earphone device should be worn on the user's ears again and the answer the call via the wireless earphone device.

As known, the volumes of the mobile phones or PDAs are not very large due to their portable features. In this circumstance, the operating interface for inputting data becomes hindrance from using the wireless apparatus because it is relatively small and is not user-friendly enough. For a purpose of increasing convenience of inputting data, a large-sized exclusive keyboard can be utilized for inputting a great amount of data into the wireless apparatus.

Although the above peripheral devices are applicable in some circumstances, they still have many drawbacks to be overcome.

For example, as previously described, the wireless earphone device should be taken out from the user's ears to view the information displayed on the screen and afterwards worn on the user's ears again. The repeated actions of taking out and wearing the wireless earphone device are inconvenient.

In addition, such a wireless earphone device is not satisfactory because the user usually feels uncomfortable when a weighty or bulky wireless earphone is directly worn on the user's ear. In particular, it is inconvenient for the user who wears glasses to wear the wireless earphone because the glasses frame may interfere with the wireless earphone.

Moreover, although the exclusive keyboard of the wireless apparatus facilitates inputting data into the wireless apparatus, it is also inconvenient for the user to carry this exclusive keyboard because the exclusive keyboard occupies much space.

SUMMARY OF THE INVENTION

It is an object of the present invention to provide a reconfigurable peripheral device for use with a wireless apparatus, in which different peripheral members are included in the reconfigurable peripheral device to be selected according to the user's requirement.

In accordance with an aspect of the present invention, there is provided a reconfigurable peripheral device for use with a wireless apparatus. The reconfigurable peripheral device is used for receiving a signal from the wireless apparatus and transmitting a signal to the wireless apparatus and comprises a first member, a second member and a third member. The first member includes a badge. The second member is detachably coupled to the first member, and comprises a wireless signal processing circuit for receiving the signal from the wireless apparatus and transmitting the signal to the wireless apparatus. The third member is coupled to the second member, and comprises an output device for outputting the signal received by the second member to the user.

Preferably, the third member further comprises an input device for inputting a user's information into the second member therevia, wherein the output device is an earphone, and the input device is a microphone.

Preferably, the signal received by the wireless signal processing circuit is issued from a mobile phone.

In an embodiment, a surface of the first member has a receiving part, and the second member further comprises a hook structure to be inserted into the receiving part such that the second member is secured to the first member.

In an embodiment, the second member further comprise receiving hole, and the third member further comprises a signal pin to be inserted into the receiving hole such that the third member is coupled to the second member.

In an embodiment, the second member further comprises a display for indicating information from the wireless apparatus.

In an embodiment, the second member further comprises several function keys.

In an embodiment, the first member further comprises a first electrical conduction part, and the second member further comprises a second electrical conduction part.

In an embodiment, the first member further comprises a display for indicating the information from the wireless apparatus when the first member is electrically connected to the second member.

In an embodiment, the first member further comprises a keyboard for inputting data to the wireless apparatus therevia.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
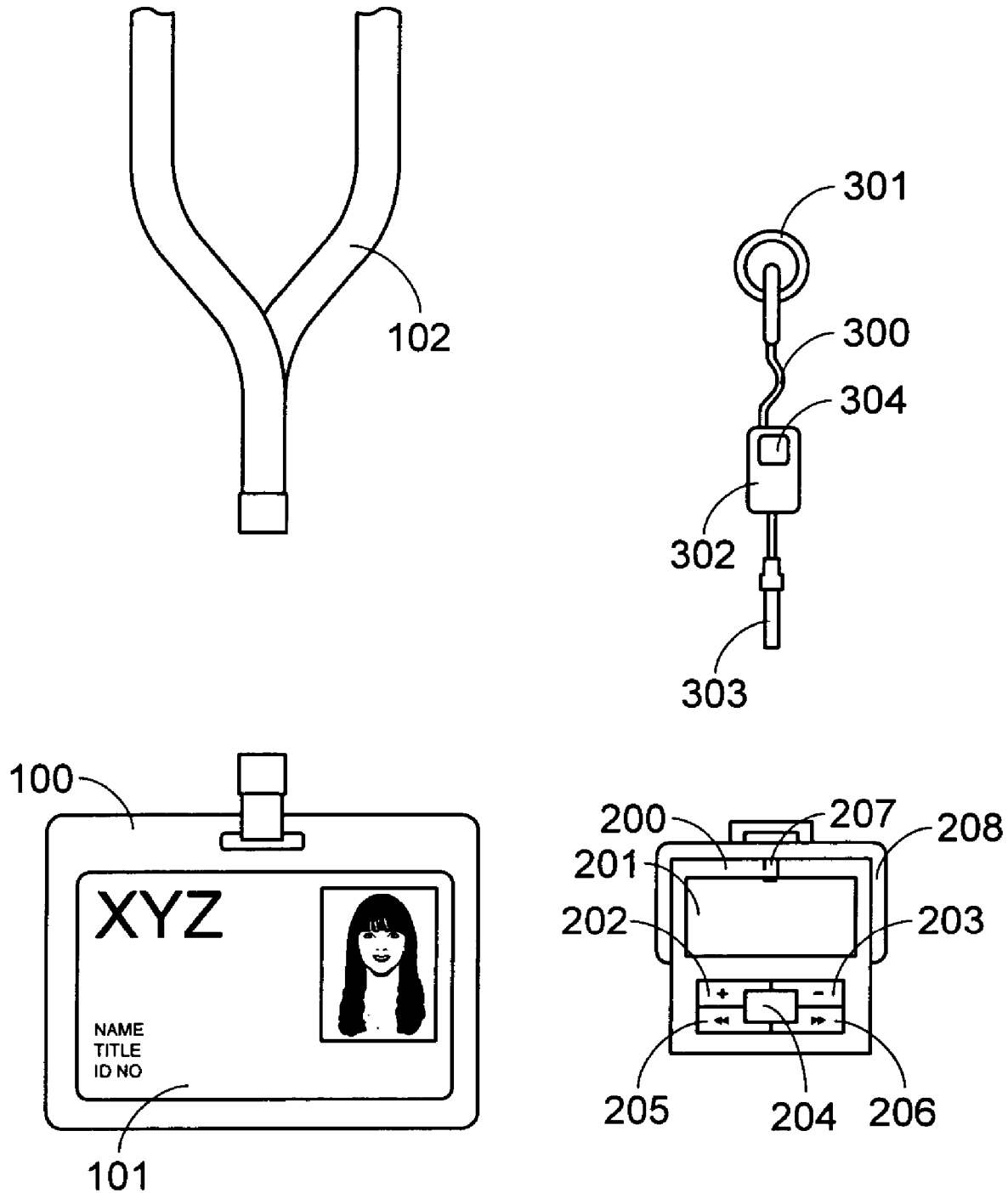
FIG. 1 is a schematic exploded view of a reconfigurable peripheral device for use with a wireless apparatus according to a first embodiment of the present invention.

Referring to FIG. 1, a schematic exploded diagram of a reconfigurable peripheral device for use with a wireless apparatus according to a first embodiment of the present invention is shown.

The reconfigurable peripheral device for use with a wireless apparatus, as shown in FIG. 1, comprises a first member 100, a second member 200, a third member 300 and a neck strap 102 to be used in the first member 100.

The first member 100 includes a badge, such as an identification card 101 for indicating the identity of the user. The second member 200 comprises a liquid crystal display (LCD) 201 and several function keys 202~206. The function keys 202 and 203 are used to control the functions of volume up and volume down, respectively. The function key 204 is used to control the power on/power off functions. Via the function keys 205 and 206, the data items are controlled to move forwards and backwards, respectively. The second member 200 further comprises a receiving hole 207 and a hook structure 208. The third member 300 comprises an output device 301, an input device 302, a connecting pin 303 and a communicating control key 304. Examples of the output device 301 and the input device 302 are an earphone and a microphone, respectively.

Figure 2A:
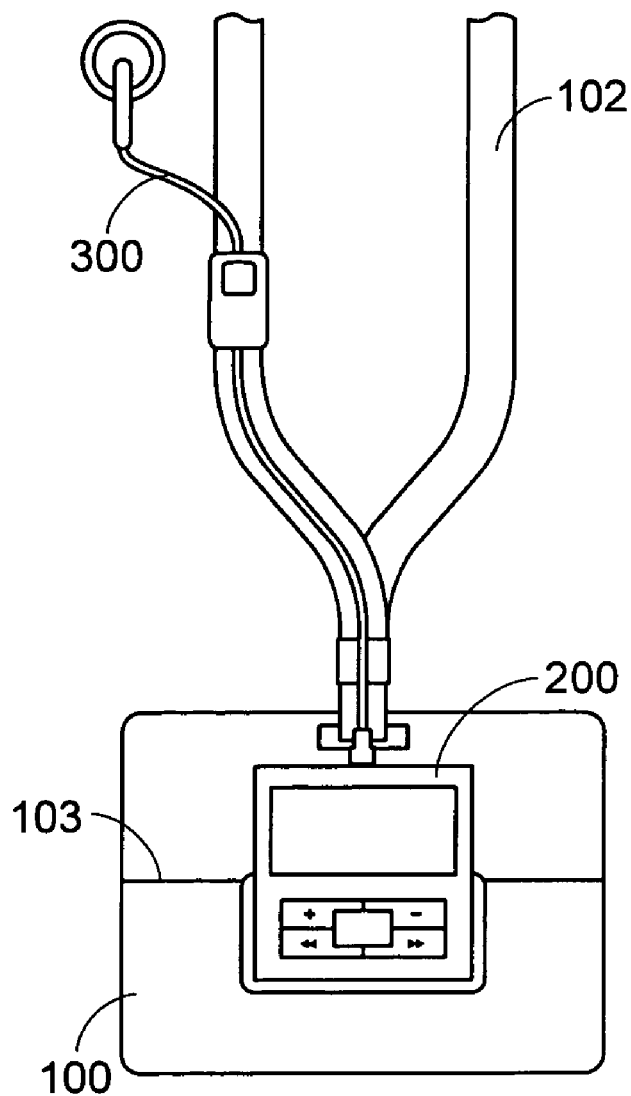
FIGS. 2(A) and 2(B) are schematic front and side views of the reconfigurable peripheral device in FIG. 1 after assembled, respectively.
Figure 2B:
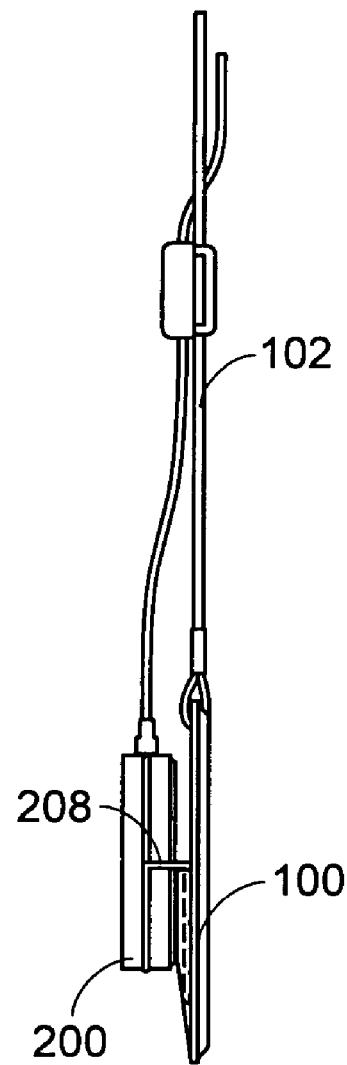

Please refer to FIG. 2(A), which schematically illustrates the assembly of the first member, the second member and the third member as shown in FIG. 1. After the hook structure 208 of the second member 200 is inserted into the receiving part 103 at the rear side of the first member 100, the second member 200 is combined with the first member 100. The assembled configuration may also be illustrated with reference to FIG. 2(B), which is a side view of FIG. 2(A).

The method of using the reconfigurable peripheral device peripheral device of the present invention will be described as follows in more details.

First of all, when the user is in his office, the assembly of the first member 100, the second member 200 and the third member 300 is implemented, as is shown in FIG. 2(A).

The first member 100 includes an identification card 101 for indicating the identity of the user in the office.

The second member 200 is used to receive and transmit the signals from the wireless apparatus such as a mobile phone. The liquid crystal display (LCD) 201 of the second member 200 is used to display the information issued from the mobile phone, for example the phone number of the caller. The function keys 202 and 203 of the second member 200 are used to control the functions of volume up and volume down, respectively. The function key 204 is used to control the power on/power off functions. Via the function keys 205 and 206, the data items are controlled to move forwards and backwards, respectively.

Figure 3:
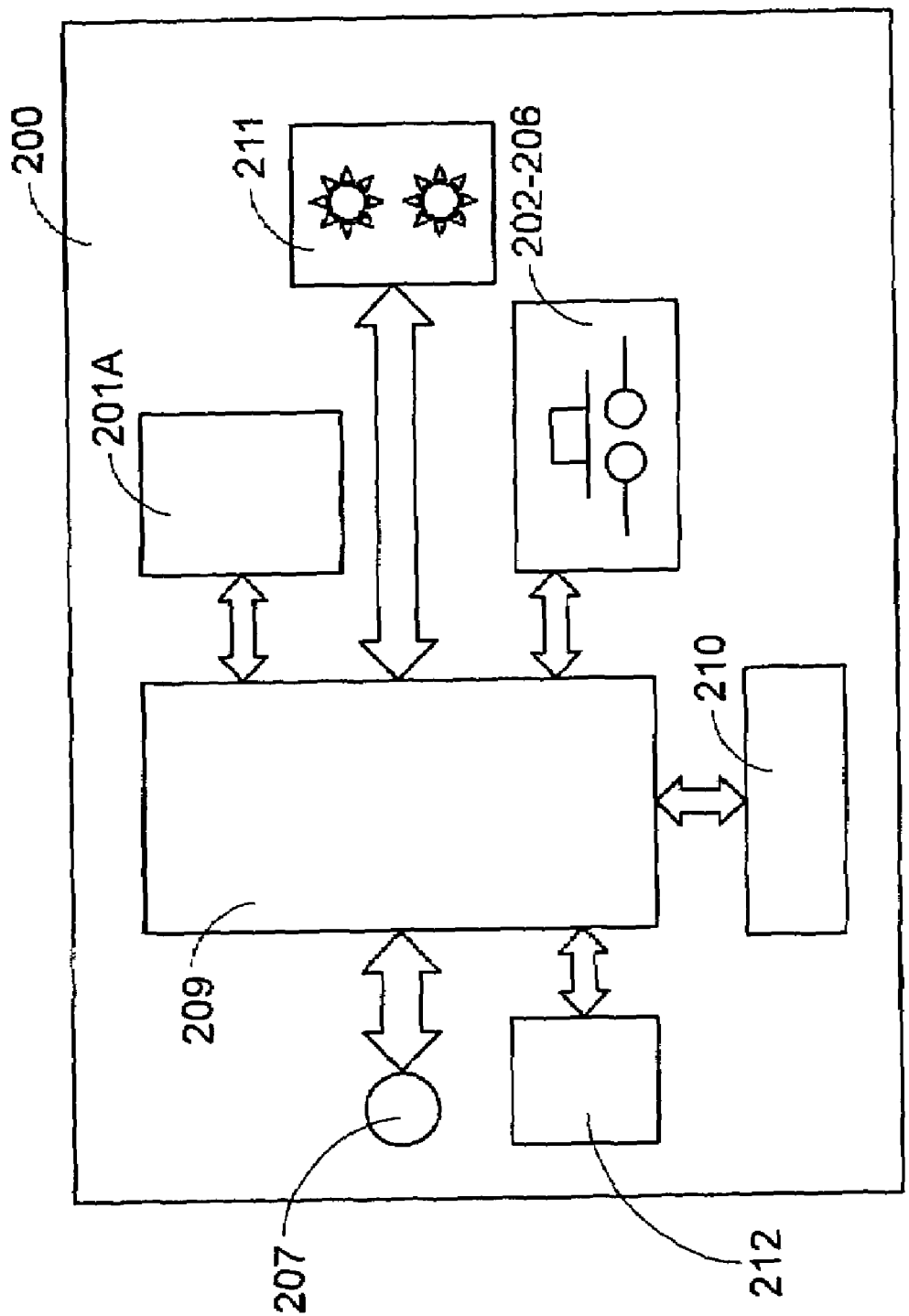
FIG. 3 a schematic circuit block diagram illustrating the second member used in the reconfigurable peripheral device of the first embodiment.

Referring to FIG. 3, a schematic circuit block diagram of the second member 200 is shown. The second member 200 comprises a receiving hole 207, a LCD driver 201A, several function keys 202~206, a wireless signal processing circuit 209, a vibrator 210, an indicating light 211 and a power supply circuit 212. The receiving hole 207 is used to accommodate the connecting pin 303 of the third member 300. The LCD 201 is driven by the LCD driver 201A. The wireless signal processing circuit 209 is used to process the received wireless signal and then emit the processed wireless signal. Once the wireless signal is transmitted to the second member 200, the vibrator 210 generates a vibrating action to notify the user that the wireless signal is received. Via the indicating light 211, the operating statuses such as the powering on and off statues and the on-line and off-line communication statuses are indicated. The power supply circuit 212 provides the power required for operating the second member 200.

When the mobile phone of the user receives an incoming call, a wireless signal is transmitted to the wireless signal processing circuit 209 of the second member 200, and the vibrator 210 will vibrate to notify the user. In addition, the information shown in the screen of the mobile phone, for example the phone number of the caller, may also be displayed on the LCD 201. In this circumstance, the user will determine whether to answer this call. After the communicating control key 304 is pressed down, the user will begin to dialogize with the caller. Via the earphone device 301 of the third member 300, the user can hear the voice of the caller. Via the microphone 302, the contents of reply will be inputted into the second member 200 and then transmitted to the mobile phone via the second member 200.

If the identification card needs not to be worn, for example in a case that the user is not in the office, the second member 200 can be detached from the first member 100 as required. The second member 200 and the third member 300, however, are also employed and thus the wireless earphone still functions. Alternatively, a neck strap similar to the neck strap 102 as shown in FIG. 2(A) can be used to wear the second member 200 on the user.

It is noted that, however, those skilled in the art will readily observe that numerous modifications and alterations of the connection between the first member 100 and the second member 200 may be made while retaining the teachings of the invention. Accordingly, the above disclosure should be limited only by the bounds of the following claims.

Figures 4A, 4B:
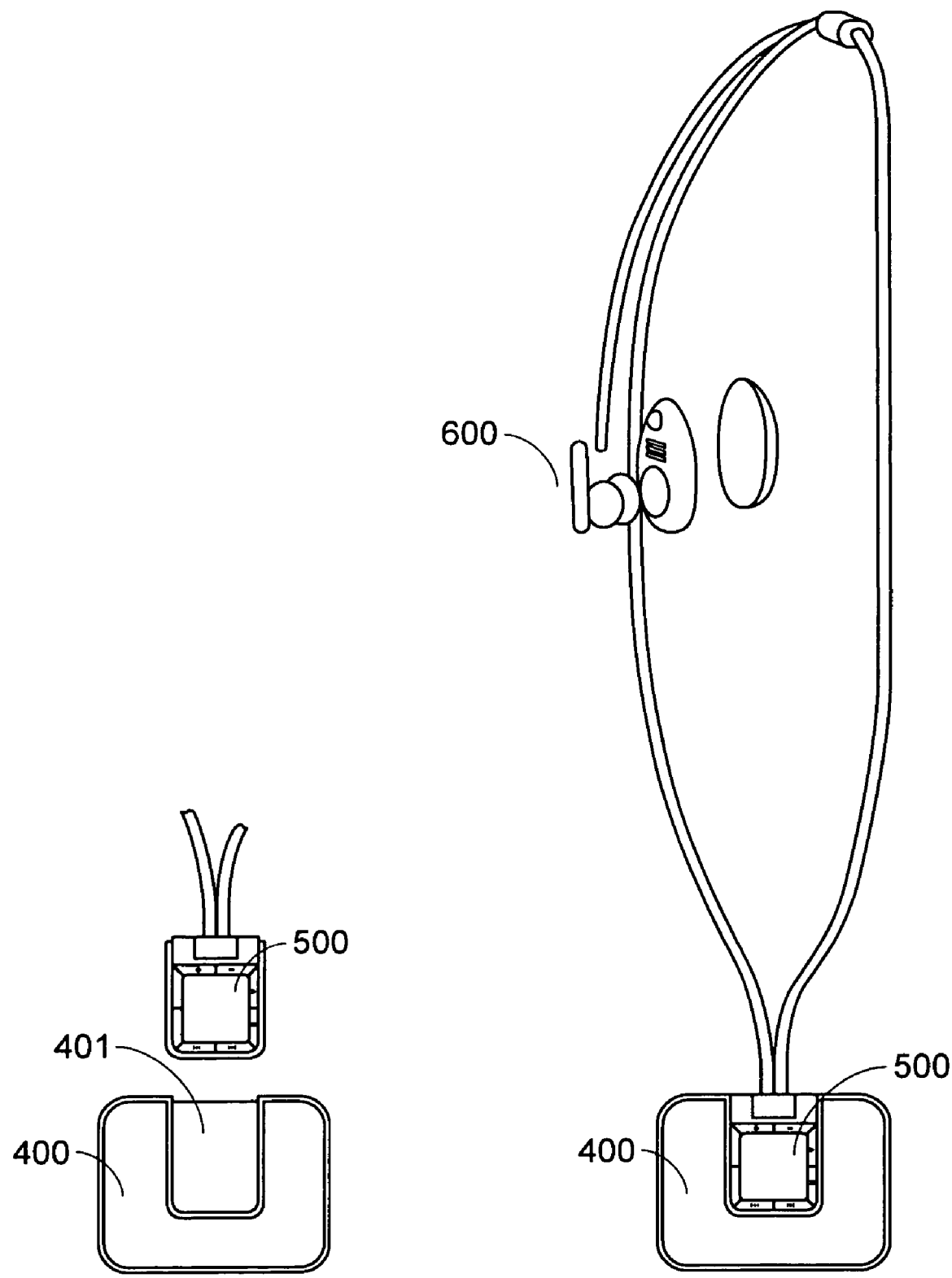
FIGS. 4(A) and 4(B) are schematic exploded and assembled views of a reconfigurable peripheral device according to a second embodiment of the present invention, respectively.

A second embodiment of a reconfigurable peripheral device according to the present invention is illustrated in FIGS. 4(A) and 4(B). In this embodiment, the reconfigurable peripheral device comprises a first member 400, a second member 500 and a third member 600. The rear surface of the first member 400 has a gliding slot 401. The second member 500 can glide in the gliding slot 401, as shown in FIG. 4(B). The reconfigurable peripheral device of FIG. 4 is somewhat distinguished from that of FIG. 2. As shown in FIG. 4(B), the third member 600 has no connecting pin to be coupled with the second member 500. Instead, the third member 600 is coupled to the second member 500 via a connecting wire, which can also be employed as the neck strap.

Figure 5:
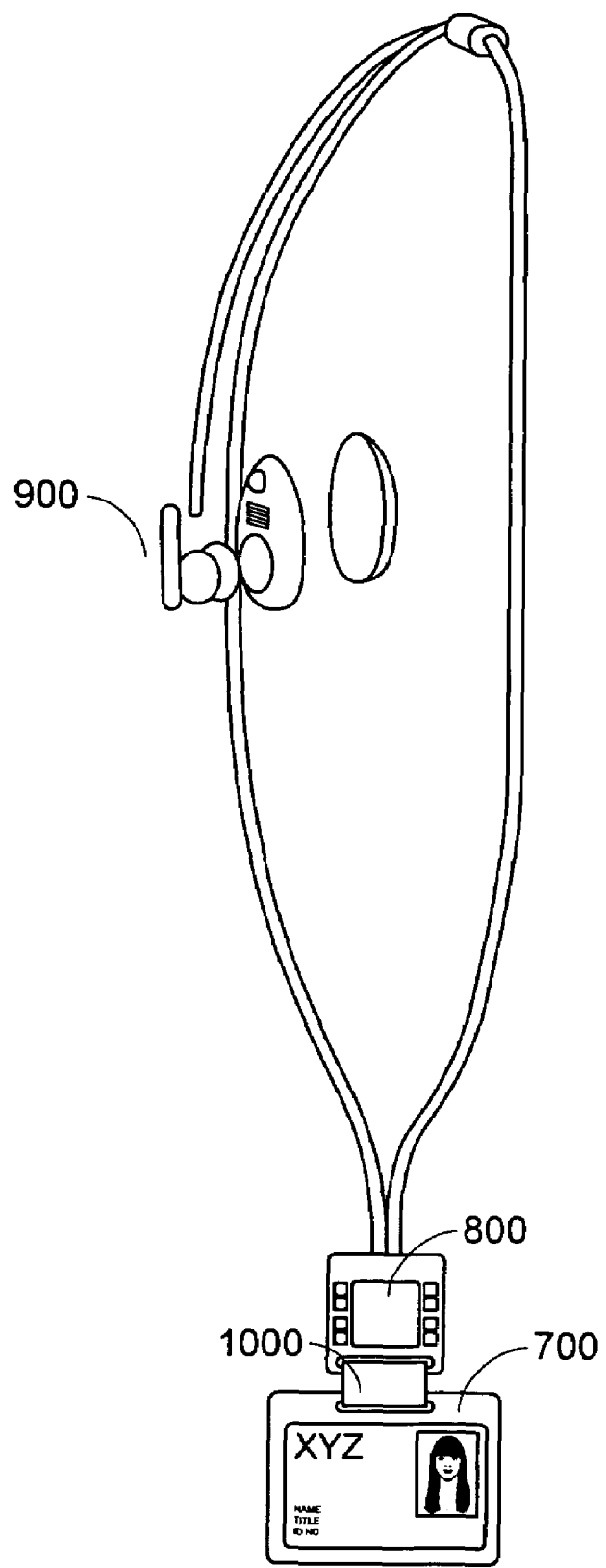
FIG. 5 is a schematic assembled view of a reconfigurable peripheral device according to a third embodiment of the present invention.

Referring to FIG. 5, a reconfigurable peripheral device according to a third embodiment of the present invention is illustrated. In this embodiment, the reconfigurable peripheral device comprises a first member 700, a second member 800 and a third member 900. The second member 800 is coupled to the first member 700 via a connecting piece 1000.

Figure 6A:
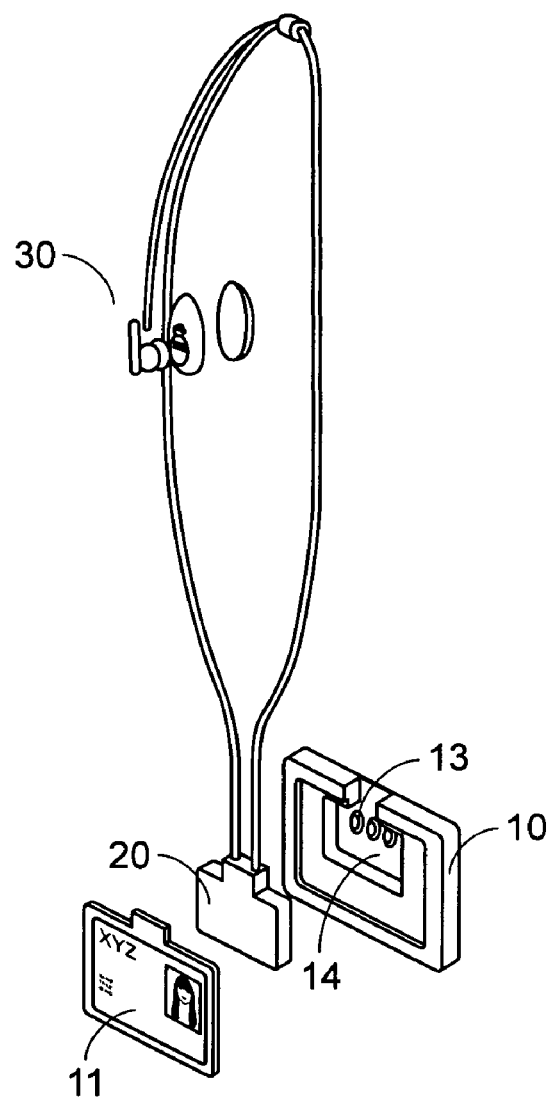
FIGS. 6(A) and 6(B) are schematic exploded views of a reconfigurable peripheral device according to a fourth embodiment of the present invention.
Figure 6B:
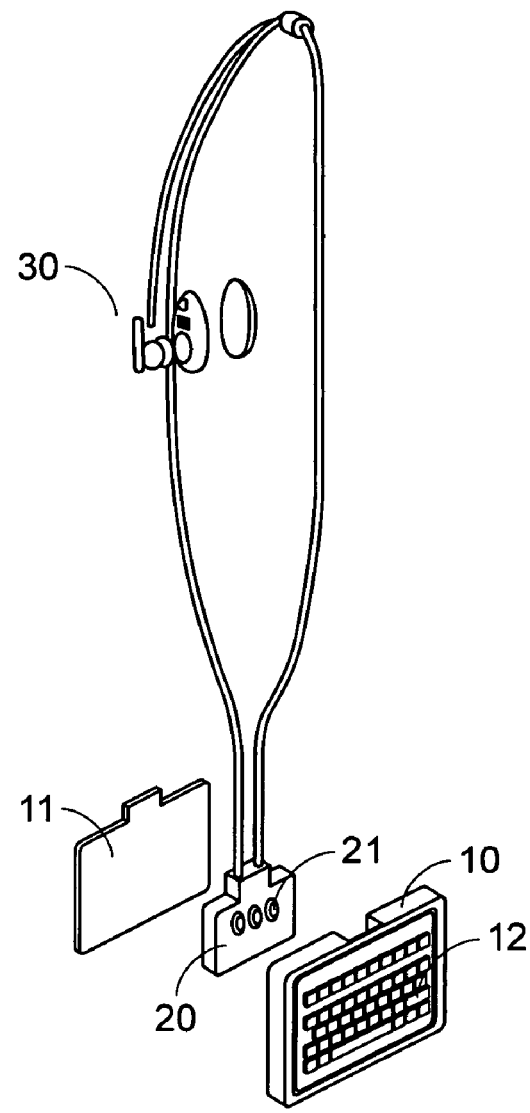

A fourth embodiment of a reconfigurable peripheral device according to the present invention is illustrated in FIGS. 6(A) and 6(B). In this embodiment, the reconfigurable peripheral device comprises a first member 10, a second member 20 and a third member 30.

The first member 10 comprises an identification card 11, a keyboard 12 and a first electrical conduction part such as the electric contact terminals 13. The second member 20 further comprises a second electrical conduction part such as the electric contact terminals 21.

Figure 7A:
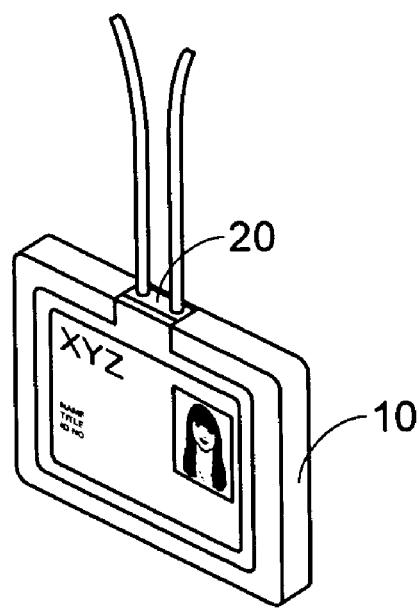
FIGS. 7(A) and 7(B) are schematic front and rear views of an assembled reconfigurable peripheral device according to the fourth embodiment of the present invention, respectively.
Figure 7B:
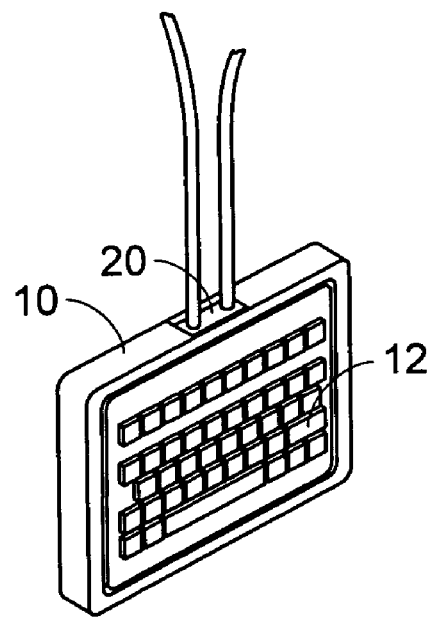

The second member 20 is accommodated within a recess structure 14 at the rear surface of the first member 10. The electric contact terminals 21 of the second member 20 are electrically connected to the electric contact terminals 13 of the first member 10. Afterwards, the second member 20 is covered with the identification card 11 so as to assemble the reconfigurable peripheral device of the present invention. The front and rear views of the assembled reconfigurable peripheral device are illustrated in FIGS. 7(A) and 7(B), respectively.

The details of FIG. 6 will be illustrated as follows. The second member 20 and the third member 30 included therein are similar to those described in the first, second and third embodiments, and are not to be redundantly described herein. The reconfigurable peripheral device of FIG. 6 is distinguished from those of the first, second and third embodiments. For example, a keyboard 12 is additional included in the first member 10.

In other words, when the first member, the second member and the third member are assembled together, the first member will have both functions of the identification card and the keyboard. In this circumstance, in order to send a short message, the user can input data via the keyboard 12. Since the first member 10 is electrically connected to the second member 20, the inputted data will be transmitted to the mobile phone through the second member 20 so as to expand the utility thereof.

If the identification card needs not to be worn, for example in a case that the user is not in the office, the second member 20 can be detached from the first member 10. Meanwhile, the second member 20 and the third member 30, however, are also employed to maintain the function of the wireless earphone.

Figure 8A:
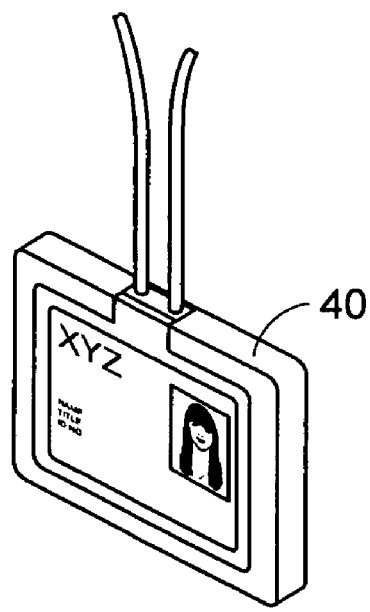
FIGS. 8(A) and 8(B) are schematic exploded views of an assembled reconfigurable peripheral device according to a fifth embodiment of the present invention.
Figure 8B:
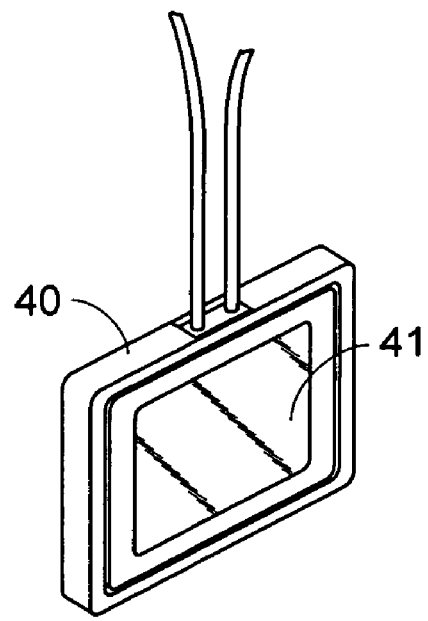

A fifth embodiment of a reconfigurable peripheral device according to the present invention is illustrated in FIGS. 8(A) and (B), which are front and rear views of the reconfigurable peripheral device, respectively. In this embodiment, the second member and the third member included therein are similar to those shown in FIG. 6, and are not to be redundantly described herein. In addition, the first member 40 further comprises a LCD 41 for indicating the information displayed on the screen of the mobile phone.

From the above description, the reconfigurable peripheral device for use with a wireless apparatus according to the present invention is advantageous because it is flexible and has extended uses. When the user is in the office, the second member and the third member for maintaining the function of the wireless earphone can be combined with the first member including the identification card. In this circumstance, the reconfigurable peripheral device has dual functions of an identification card and a wireless earphone. Whereas, if the identification card needs not to be worn, for example in a case that the user is not in the office, the identification card can be detached. The second member and the third member, however, are also worn as a decorative necklace is worn, and thus the function of the wireless earphone is maintained.

In views of the extended uses, the reconfigurable peripheral device of the present invention can be equipped with additional peripheral device such as a keyboard or a display on the identification card. As known, the conventional approach is inconvenient because the user should carry two peripheral devices to implement the functions of these peripheral devices. In contrast, according to the present invention, the additional peripheral devices are arranged on the identification card and cooperatively used with the second member. In addition, the additional peripheral devices are selected according to the user's requirement.

Therefore, the reconfigurable peripheral device of the present invention is advantageous for implementing the functions of two peripheral devices when the identification card is worn.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A reconfigurable peripheral device for use with a wireless apparatus, for receiving a signal from said wireless apparatus and transmitting a signal to said wireless apparatus, said reconfigurable peripheral device comprising: a first member including a badge; a second member detachably coupled to said first member, and comprising a wireless signal processing circuit for receiving said signal from said wireless apparatus and transmitting said signal to said wireless apparatus; and a third member coupled to said second member, and comprising an output device for outputting said signal received by said second member to said user,
   wherein said third member further comprise an input device for inputting a user's information into said second member therevia, wherein said output device is an earphone, and said input device is a microphone,
   wherein said second member further comprise receiving hole, and said third member further comprises a signal pin to be inserted into said receiving hole such that said third member is coupled to said second member.

2. A reconfigurable peripheral device for use with a mobile phone for communicating with the mobile phone, the reconfigurable peripheral device comprising:
   a) a first member having:
      i) a badge; and
      ii) a first electrical conduction part;
   b) a second member detachably connected to the first member and having:
      i) a second electrical conduction part electrically connected with the first electrical conduction part; and
      ii) a phone signal processing circuit processing phone signals wirelessly transmitted from the mobile phone; and
   c) a third member connected to the second member and having:
      i) an earphone outputting the phone signals received by the second member; and
      ii) a microphone receiving and transmitting sounds from a user to the second member.

3. The reconfigurable peripheral device according to claim 2, wherein the second member has a display indicating information from the mobile phone.

4. The reconfigurable peripheral device according to claim 2, wherein the second member has a plurality of function keys.

5. The reconfigurable peripheral device according to claim 2, wherein the first member has a display displaying information from the mobile phone when the first member is electrically connected to the second member.

6. The reconfigurable peripheral device according to claim 2, wherein the first member has a keyboard for inputting data into the mobile phone.

* * * * *